United States Patent [19]

Simioni

[11] Patent Number: 4,479,769
[45] Date of Patent: Oct. 30, 1984

[54] APPARATUS FOR PRODUCING ARTICLES FROM THERMOSETTING RESIN

[75] Inventor: Francesco Simioni, Padua, Italy

[73] Assignee: Safilo S.p.A., Pieve di Cadore, Italy

[21] Appl. No.: 247,051

[22] Filed: Mar. 24, 1981

Related U.S. Application Data

[62] Division of Ser. No. 046,505, Jun. 7, 1979, Pat. No. 4,362,685.

[30] Foreign Application Priority Data

Jun. 30, 1978 [IT] Italy .................. 25185 A/78

[51] Int. Cl.³ .............................. B29C 5/04
[52] U.S. Cl. ................................ 425/434; 425/73; 425/425
[58] Field of Search ............... 264/311; 425/434, 425, 425/73

[56] References Cited

U.S. PATENT DOCUMENTS

| | | | |
|---|---|---|---|
| 2,618,031 | 11/1952 | Mazer | 264/311 |
| 4,034,955 | 7/1977 | Wallace | 264/434 |
| 4,161,065 | 7/1979 | Gigante | 264/18 |
| 4,294,792 | 10/1981 | Arons et al. | 264/311 |

FOREIGN PATENT DOCUMENTS

| | | | |
|---|---|---|---|
| 1117298 | 11/1961 | Fed. Rep. of Germany | 264/311 |
| 3929398 | 1/1966 | Japan | 264/311 |

OTHER PUBLICATIONS

Rubber-Mold Spin-Casting, Tekcast Ind. Inc., In Machine Design, Jan. 1977, pp. 113-117.

*Primary Examiner*—James H. Derrington
*Attorney, Agent, or Firm*—Birch, Stewart, Kolasch & Birch

[57] ABSTRACT

The method for producing articles from thermosetting resins, more particularly articles having a complex, variable shape such as spectacle frames, comprising bottom casting liquid thermosetting resin into a mold and causing the resin to set in a field of centrifugal force.

6 Claims, 4 Drawing Figures

APPARATUS FOR PRODUCING ARTICLES FROM THERMOSETTING RESIN

This application is a divisional of copending application Ser. No. 046,505, filed on June 7, 1979 now U.S. Pat. No. 4,362,685, which issued on Dec. 7, 1982.

The invention relates to a method of producing articles from thermosetting resins. More specifically, the invention relates to a method of using thermosetting resins such as epoxide, polyurethane and polyester resins for molding articles having a complex shape and a length many times greater than their transverse dimension, e.g. in the case of spectacle frames or the like.

It is known to produce articles of the aforementioned kind by using various systems and technologies involving liquid thermosetting resins, i.e. substances which are initially liquid but are irreversibly converted into solids by the effect of heat and/or catalysts, initiators, activators or the like.

In order to obtain articles from thermosetting resins such that the strength, optical, electrical and, not least, aesthetic characteristics of the articles meet the normal recognized market requirements, it is necessary that the methods, technology and apparatus used for producing the articles must be such that the material (resin) in the finished article is very homogeneous and continuous after setting, and more particularly is free from bubbles. It is well known that bubbles form weak points which may easily initiate fractures in the finished article when subjected to mechanical stresses. They also form discontinuities such that the article fails to meet the optical, electrical and aesthetic requirements and has to be rejected.

The following are the most commonly used and most widely developed and tested prior-art methods of moulding articles from thermosetting resin:
1. Casting into a mold in vacuo;
2. Casting into a mold at atmospheric pressure and setting or gelling of the resin under pressure and
3. Casting in a centrifuge.

These methods, though efficient for producing articles having a simple shape, have been found inadequate when the molded articles are many times longer than their transverse dimensions and/or when their cross-section varies along the article, as in the case of the front and side portions of spectacle frames. It is frequently found that finished articles made by the aforementioned methods show discontinuities varying in extent depending on the method and on the kind of thermosetting resin used. They are caused by the following two main reasons:
(1) Incomplete filling of the mold and
(2) The shrinkage resulting from the setting or gelling of the resin.

In the particular case of the manufacture of spectacle frames and parts thereof, i.e. articles which by their nature have a varied complex shape, the most frequently-used prior-art method is casting in a mold in vacuo, special technical precautions being taken to ensure complete filling of the molds and efficient compensation of the shrinkage due to gelling of the resin, in order to reduce or completely eliminate the serious disadvantages of discontinuities and the formation of bubbles in the finished articles.

These technical precautions usually result in a considerable increase in the mechanical complexity of the molds, with a consequent increase in the cost of producing them, and the construction of feed heads for making up the shrinkage due to gelling. It is also necessary to use a considerable amount of resin (up to twice or three times the amount strictly necessary for manufacturing the finished article) and laborious, expensive mechanical work is required on the finished article in order to remove the feed heads.

Another point with regard to spectacle frames is that they have to undergo continual development and change in dependence on fashion. Corresponding variations have to be made to the molds. It is therefore economically desirable for the molds to be as simple as possible and suitable for producing a molded article which does not require much subsequent finishing work.

The method of casing in a mold at atmospheric pressure, followed by setting or gelling of the resin at pressure, when used for molding spectacle frames, presents considerable difficulties with regard to the filling of the mold with resin. A spectacle frame usually has a variable cross-section and consequently the mold has to be filled by injecting resin at a number of predetermined points to avoid enclosing bubbles as a result of variations in the flow rate of liquid resin, resulting from variations in the cross-section of the mold. The process also requires the use of completely deaerated liquid resins and the rejection of considerable amounts of resin in order to ensure that the mold is completely filled.

The invention is based on the problem of providing a method of producing articles from thermosetting resin, more particularly articles having a complex, variable shape such as spectacle frames, which obviates the previously-mentioned disadvantages of the prior-art methods.

SUMMARY OF THE INVENTION

To this end, the invention provides a method characterised in that it consists in bottom casting a liquid thermosetting resin into a mold and causing the resin to set in a field of centrifugal force.

According to a preferred embodiment, the method according to the invention consists in the bottom casting a liquid thermosetting resin in a field of centrifugal force and causing the resin to set in a field of centrifugal force.

The invention also relates to apparatus for performing the aforementioned method, the apparatus comprising:
 a circular mold held so that its axis is vertical and comprising a top half-mold above a bottom half-mold,
 a number of impressions formed in the mold,
 a casting well at the centre of the mold, coaxial with the vertical axis and accessible from the exterior of the top half-mold,
 a number of ducts radially formed in one of the half-molds and extending to near the mold periphery, each duct being in liquid communication with the casting well at one end and with at least one of the impression at the other end,
 at least one cavity for each impression formed in the top half-mold near the casting well and communicating at the bottom with the respective impression and at the top with the environment outside the mold, the cavity being used to form a corresponding feed head for making up for shrinkage due to the setting of the resin, and means for rotating the mold around the vertical axis and means for heating the mold to the predetermined operating temperature.

The main advantages of the method according to the invention are that the mold is efficiently filled with liquid thermosetting resin, for the following reasons:

(1) The air is expelled from the impression formed in the mold, since the resin is bottom cast (from the periphery towards the centre of the mold);

(2) Any bubbles in the liquid resin which gradually fills the impressions are gradually extracted, as a result of Archimedes' principle.

In addition, the shrinkage resulting from the setting or gelling of the chosen resin in the field of centrifugal force is compensated by the pressure exerted by each small feed head provided for each impression and extending from the direction of the axis of rotation of the mold. The shrinkage is also compensated by the predetermined back-pressure of the liquid resin in the radial supply duct (bottom supply) of resin in the impression. The amount of thermosetting resin required for molding is not more than 5% above the theoretical.

Another advantage is that the mixture of thermosetting resin, catalysts, accelerators and initiators, if required, can be used even without being deaerated; this obviates all the manipulation of the mixture required in the prior-art methods in order to expel air as quickly as possible.

Another advantage is that the molds used for the process according to the invention are much simpler than those required in the prior-art methods, with the consequent considerable saving in cost and in investment. It has been found that the molded articles can be given the final shape by simple, rapid and inexpensive machining.

Another non-negligible advantage of the method according to the invention is that use can be made of thermosetting resins having a wide range of viscosity, if the centrifugal field and the mold temperature are suitably regulated.

BRIEF DESCRIPTION OF THE DRAWINGS

Other features and advantages of the invention will be plain from the following description of an example of the method according to the invention and an embodiment of the apparatus and mold. The description is with reference to the accompanying drawings, which are given by way of non-limitative illustration and in which.

DESCRIPTION OF A PREFERRED EMBODIMENT

Figure 1:
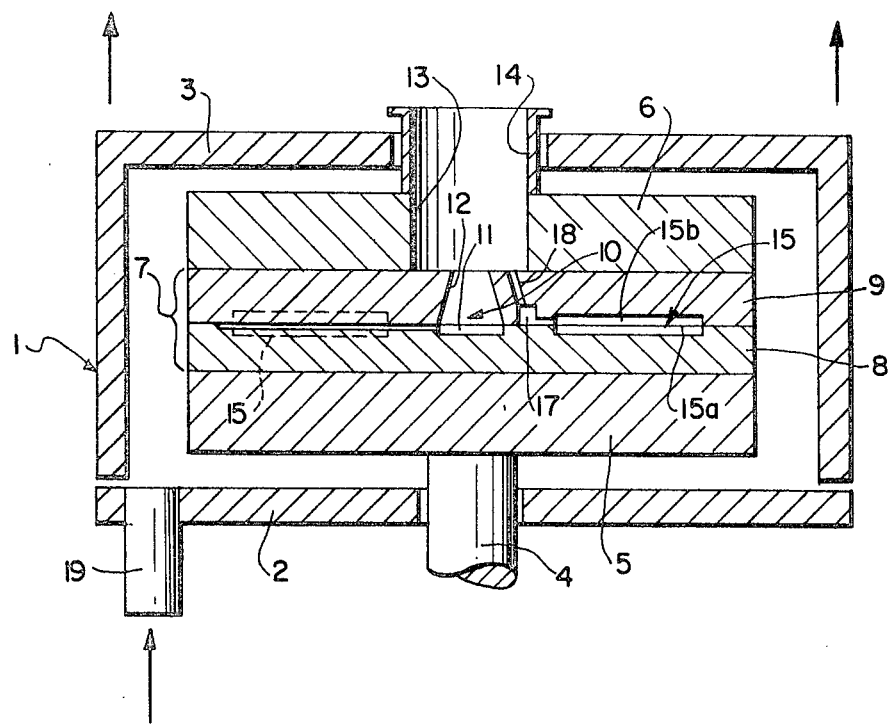
FIG. 1 is a diagram of apparatus for performing the method according to the invention.

As shown in FIG. 1, apparatus for performing the method according to the invention mainly comprises a thermostatically controlled chamber diagrammatically indicated by 1, comprising a plate or base 2 and a hood 3 made of heat-insulating material, the hood being movably guided in the vertical direction and equipped with conventional lifting means (not shown). An axially vertical, mechanically driven shaft 4 rotatably extends through base 2 and is driven in rotation by a suitable motor (conventional and therefore not shown) capable of driving it at a speed of e.g. 100–1500 rpm.

A cylindrical bottom plate 5 having a predetermined diameter and thickness is rigidly and coaxially secured (by conventional means, not shown) to the top end of shaft 4 inside chamber 1. A corresponding cylindrical top plate 6 is secured to shaft 4 in a position coaxially above the bottom plate 5. A circular mold (general reference 7) is coaxially disposed between plates 5 and 6 and comprises a bottom half-mold 8 and a top half-mold 9. Plates 5 and 6 are fitted with a clamping device for removably securing one plate to the other in order to hold the half-molds 8, 9 tightly in contact as required by the operation of the apparatus.

Mold 7 has a central, coaxial casting well 10 comprising a substantially cylindrical, blind aperture 11 in the centre of the bottom half 8 and a coaxial through aperture 12 in the top half 9.

The through aperture 12 is preferably frusto-conical and tapers towards the exterior of mold 7. The casting well 10 is connected to the exterior of chamber 1 by a cylindrical aperture 13 in plate 6 and an aperture 14 in the centre of hood 3.

Mold 7 is formed in conventional manner with a number of similar impressions, each of which is indicated by the general reference 15 and comprises a half-impression 15a in the half-mold 8 and a corresponding half-impression 15b in the half-mold 9.

Figure 2:
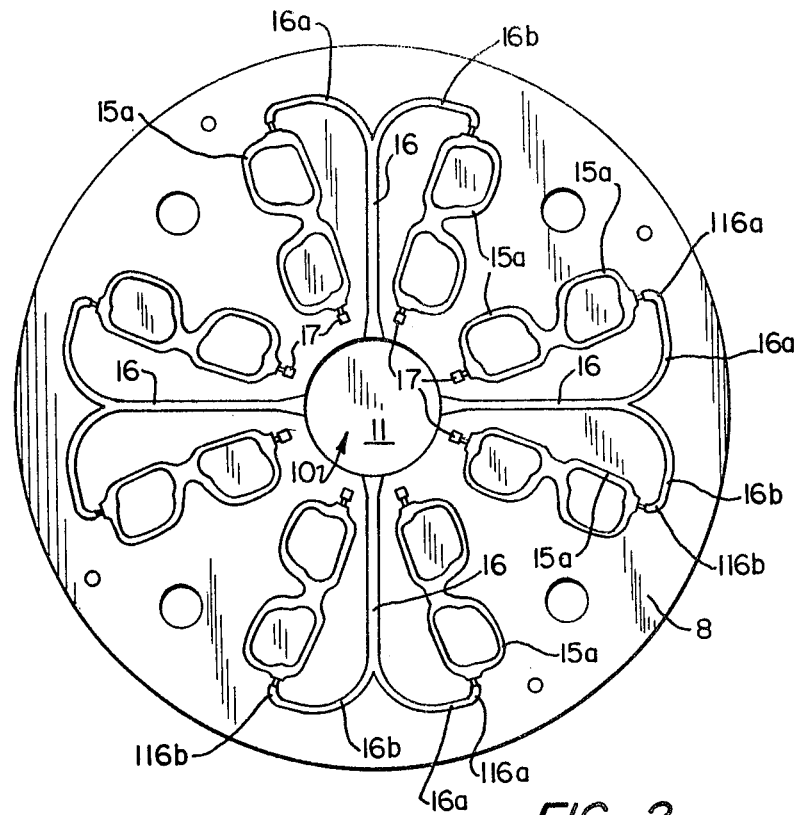
FIG. 2 is a plan view of the bottom half of a mold used in the apparatus in FIG. 1 for molding the front parts of spectacle frames.
Figure 3:
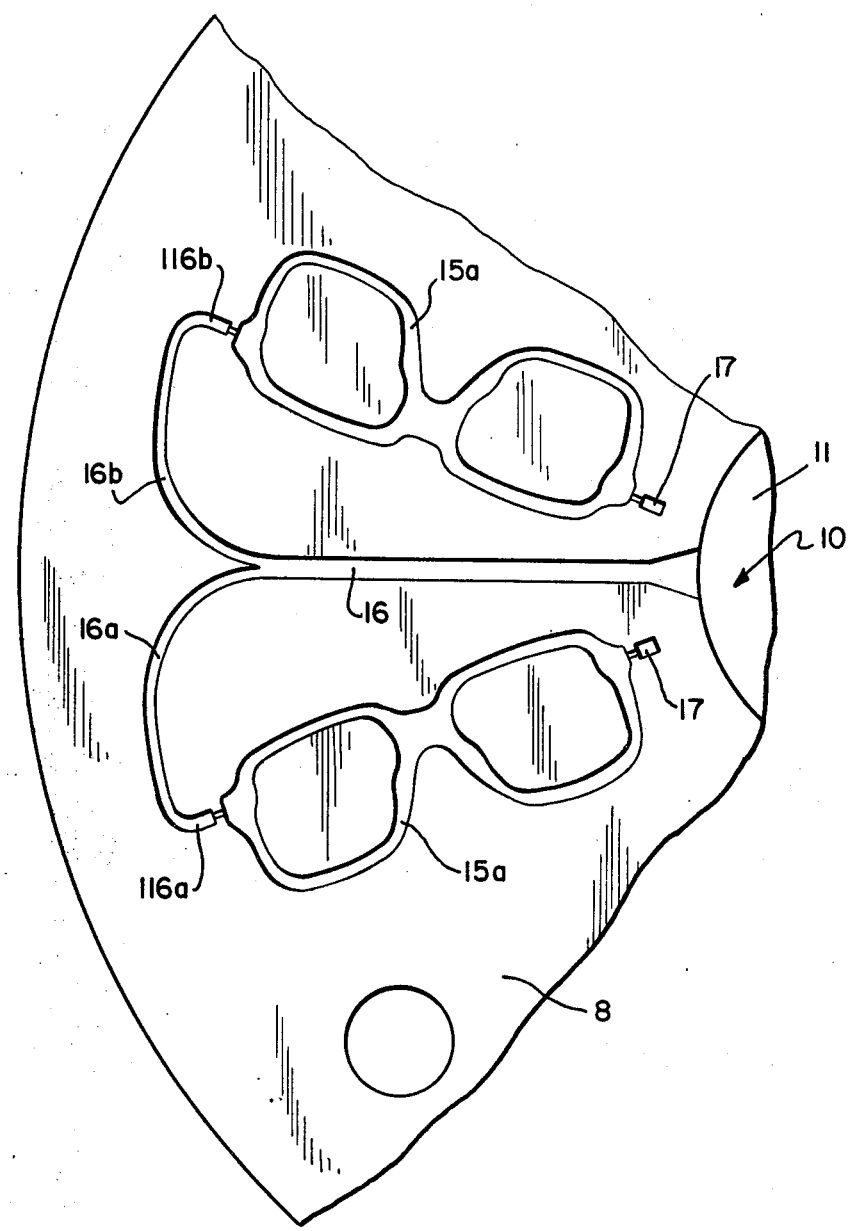
FIG. 3 is a larger-scale partial view of FIG. 2.

In a preferred embodiment, in the case of impressions 15 for molding the front portions of spectacles (FIGS. 2 and 3), mold 7 has eight impressions 15 regularly distributed around the circumference and extending radially in a ring between the casting well 10 and the periphery of mold 7. Each impression 15 is at a predetermined radial distance from well 10 and from the periphery of mold 7.

The bottom half-mold 8 is also formed with a number of supply ducts 16, each extending radially between two radially extending half-impressions 15a and communicating at one end with well 10 or preferably with that portion 11 of the well which is formed in the bottom half 8. The other end of each duct 16 is divided into two ducts 16a, 16b (FIGS. 2 and 3) which are first substantially concentric with half-mold 8, followed by terminal portions 116a, 116b which extend radially towards well 10 and terminate in liquid communication with the impressions 15a, 15b between which the duct 16 is disposed.

Each impression 15 is in liquid communication with an associated feed-head cavity 17 formed in mold 7 in a position between well 10 and impression 15. More particularly, in a preferred embodiment, each cavity 17 is formed in the top half-mold 9 in a direction parallel to the axis of the half-mold and communicates with the exterior of chamber 1 via a respective vent 18.

Figure 4:
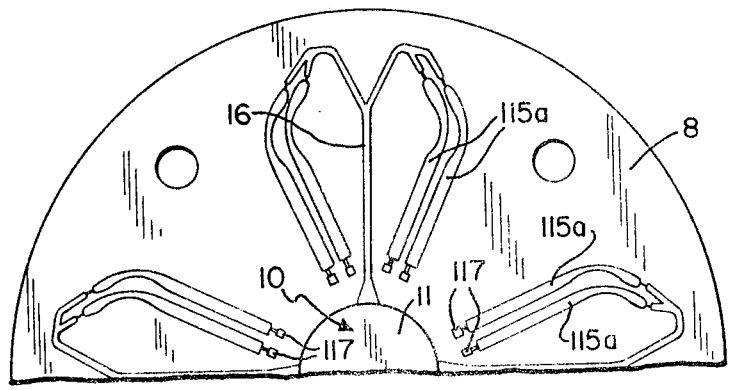
FIG. 4 is a partial plan view of the bottom half of a mold used in the apparatus in FIG. 1 for molding side portions of spectacle frames.

FIG. 4 shows part of an embodiment of the bottom half-mold 8 used to mold side portions for spectacle frames. In this case there are preferably sixteen impressions 115 (115a and 115b), eight to the right and eight to the left, the impressions being connected in pairs (two to the right and two to the left) to a single radial duct 16 which in turn is connected to the well 10.

The method according to the invention, using the aforementioned apparatus, is as follows:

Half-molds 8,9 are treated with a known prior-art parting agent, e.g. silicone or fluorinated hydrocarbon, and heated to a predetermined temperature between 50° and 80° C., e.g. 70° C. Mold 7 is then closed between plates 5,6 in chamber 1, which is sealed and kept at the predetermined temperature by circulating a stream of temperature-controlled air through passages formed in base 2 of chamber 1 (FIG. 1).

A predetermined amount of resin for molding the front or side portions of spectacle frames is mixed and combined in known manner with a suitable setting agent and placed in well 10. The quantity of resin is chosen so as to fill the set of impressions (15 or 115) and about two-thirds of the cavities (17 or 117) for compensating feed heads.

At this stage, the assembly comprising the closed mold 7 and plates 5,6 is rotated by shaft 4 at a speed of e.g. 700 rpm.

The resulting field of centrifugal force drives the mixture of liquid resin from well 10, so that it flows through each duct 16 towards the periphery of the mold. Without discontinuities in flow, the stream splits up in portions 16a, 16b of each duct 16, after which the resin mixture is supplied to impressions 15, 15 at the end of the terminal portions 116a, 116b.

Because of the field of centrifugal force and owing to the principle of communicating vessels, the resin mixture gradually fills each impression 15 and "rises" towards the axis of rotation of the mold, or rather towards the well 10. During the filling process, the air in each impression 15 is driven towards the axis of rotation and discharged through the feed head cavity 17 and the vent 18 associated with each feed head, the vent extending near the axis of rotation of the mold.

During the process of filling each impression 15, i.e. substantially a process of bottom casting in a centrifugal field, any air in the resin mixture initially placed in well 10 escapes from the mass of resin in the form of bubbles owing to the well-known principle of Archimedes, and escapes through vent 18.

After the impressions 15 have been filled by the chosen resin mixture, the mold is kept in rotation at the same predetermined velocity for a limited period sufficient to gel the resin, i.e. in a field of centrifugal force. If the aforementioned temperature and speed of rotation are used and if the mixture of epoxide resin and setting agent is appropriate, it is found that the gelling process in a field of centrifugal force is complete after about 7 minutes.

At the end of this period, rotation is stopped and the mold is taken from the apparatus and placed in an oven at 70°–80° C. for a further 30 minutes approximately, after which the material is released.

Of course, if the mold temperatures are lower (e.g. of the order of 50° C.), the rotation times will be longer (20 minutes) and the speed of rotation will be less (200–300 rpm).

After release of the material, the mold is at practically the same temperature as before and is ready for a second working cycle, during which the products are sent for finishing, the operation being greatly simplified since the feed head for making up the loss of material does not leave a mark on the cross-section of the product.

Of course, with regard to the process for inserting the resin mixture in the well 10, the aforementioned method can be performed by introducing the material after the mold has been set in rotation. Furthermore, the gelled resin can set in the mold when it is in rotation, i.e. in a field of centrifugal force, instead of in an oven as aforementioned.

It has been found that the amount of fluid resin mixture required for the molding operation is not more than 5% above the theoretical. More particularly, repeated tests showed that the required excess of resin was between 0.5 and 3% of the weight of the article.

What is claimed is:

1. An apparatus for molding a resin material in a mold having at least one article impression wherein said article impression is disposed in a centrifugal field about an axis of rotation comprising in combination:
   a circular mold, arranged so that said axis of rotation is vertical, including a top half-mold above a bottom half-mold;
   means for rotating the mold around the vertical axis;
   a number of impressions formed in said circular mold;
   casting well means at the center of said mold, coaxial with the vertical axis of rotation and accessible from the exterior of said top half-mold for receiving resin during rotation of said mold;
   a number of ducts radially formed in one of said half-molds and extending to near the mold periphery, each duct being in liquid communication with the casting well at one end and with a radially outward portion of at least one of the impressions at the other end wherein during rotation of said mold said resin to be molded is supplied to a radially outward portion of said article impression in a centrifugal field and said resin fills said article impression in said centrifugal field in a direction substantially toward said axis of rotation;
   at least one cavity for each impression formed in said top half-mold near the casting well and communicating at the bottom with the respective impression and at the top with the environment outside the mold, the cavity being used to form a corresponding feed head for making up for shrinkage due to the setting of the resin; and
   means for heating the mold to a predetermined operating temperature.

2. The apparatus according to claim 1 further characterized in that said mold is co-axially mounted at the end of a mechanically driven shaft and positioned in a temperature-controlled chamber.

3. An apparatus for molding a resin material in a centrifugal field about an axis of rotation, comprising:
   a rotatable circular mold including first and second half-molds and having at least one article impression formed between said half-molds;
   casting well means at the center of said mold accessible from the exterior of said mold and coaxial with said axis of rotation for receiving resin during rotation of said mold;
   means for rotating said mold about said axis of rotation;
   a resin supply duct connecting said casting well with a radially outward portion of said article impression wherein during rotation of said mold said resin to be molded is supplied to a radially outward portion of said article impression in a centrifugal field and said resin fills said article impression in said centrifugal field in a direction substantially toward said axis of rotation;
   a vent connecting said article impression with the outside environment; and
   means for heating said mold to a predetermined operating temperature.

4. The apparatus according to claim 3, wherein one of said supply ducts connects said casting well with a plurality of said article impressions.

5. The apparatus according to claim 3, and further including a feed head cavity located between said article impression and said vent.

6. The apparatus according to claim 3, and further including a drive shaft located below said mold for rotating said mold and a heating chamber formed around said mold, said heating chamber comprising a bottom portion and a removable top portion.

* * * * *